Patented Oct. 16, 1923.

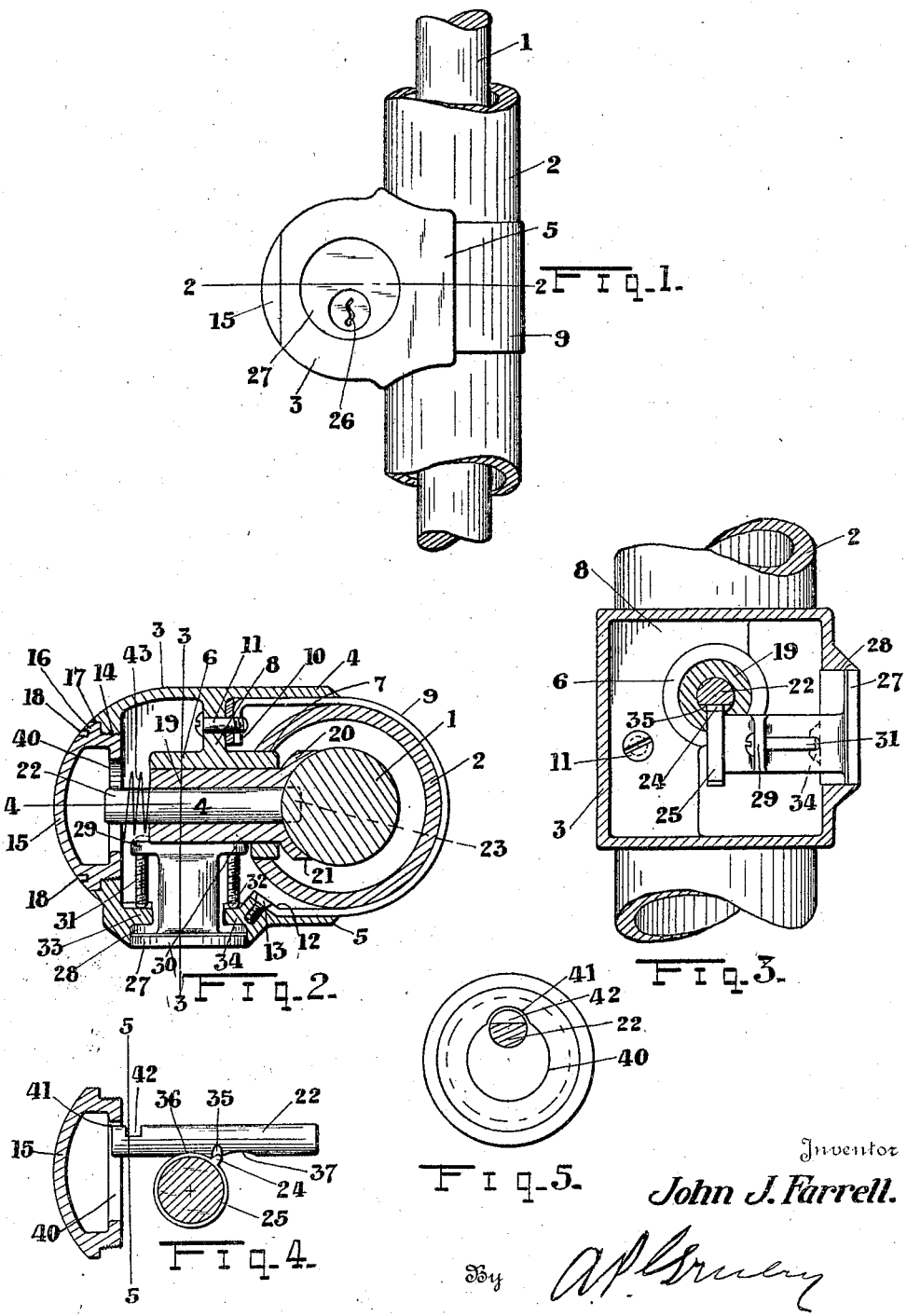

1,470,823

UNITED STATES PATENT OFFICE.

JOHN J. FARRELL, OF LAWRENCE, MASSACHUSETTS, ASSIGNOR TO A. M. FARRELL, OF PHILADELPHIA, PENNSYLVANIA.

LOCKING DEVICE.

Application filed February 1, 1922, Serial No. 533,334. Renewed July 13, 1923.

*To all whom it may concern:*

Be it known that I, JOHN J. FARRELL, residing at Lawrence, county of Essex, and State of Massachusetts, and a citizen of the United States, have invented certain new and useful Improvements in Locking Devices, of which the following is a specification, reference being had to the accompanying drawing, forming a part thereof.

My invention relates to locking devices for shafts particularly adapted for locking the steering post or other rotary shaft of an automobile, so that it cannot be rotated, and the invention has for its object to provide a simple and inexpensive device for this purpose which may be readily attached to or removed from the housing of the steering post or other shaft to be locked and when in locking position will not only hold the shaft against rotation but will prevent the device from being detached and the lock from being otherwise tampered with.

With the above described objects and other objects hereinafter explained in view, my invention consists in the construction and combination of parts hereinafter described and claimed:

Referring to the drawings:

Figure 1 is a side view of the automobile lock in position.

Figure 2 is a horizontal sectional view on line 2—2 of Figure 1, on a somewhat enlarged scale.

Figure 3 is a vertical sectional view on line 3—3 of Figure 2 and,

Figure 4 is a detail sectional view on line 4—4 of Figure 2 and,

Figure 5 is a detail cross sectional view on line 5—5 of Figure 4.

In the drawings 1 indicates the steering post of an automobile and 2 indicates the steering post housing through which the steering post extends. 3 indicates an outer casing provided on the side towards the steering post with external lugs 4 and 5 which are adapted to embrace the housing and with a central tube 6 adapted to enter an opening 7 in the housing 2. The tube 6 is connected, about midway of its length, to the outer casing 3 by a flange 8. 9 indicates a strap which extends about the housing 2 and has its ends secured to the casing 3, the end 10 being secured by bolt 11 to the annular flange 8 and its end 12 secured by screw 13 at the base of end 5.

The outer end of the casing 3, that is the end extending away from the steering post and housing, is provided with a central opening 14 to receive a screw threaded cap 15 having an outer flange 16 which fits into a recess 17, the cap being so constructed that when screwed into place its outer surface will be flush with the outer surface of the casing 3. Recesses such as 18 are provided in the outer face of the cap to receive a suitable instrument for rotating the cap to screw it into place or to unscrew it.

Through the center of the tube 6 extends an inner or floating tube 19 having its inner end cut away to fit the steering post and provided at this inner end with lugs 20 and 21 adapted to bear against the steering post and to thus increase the bearing surface of the inner end of the tube against the steering post.

Through the center of this tube 19 extends the locking pin 22, the inner end of which is adapted to enter a recess 23, formed in the steering post. This locking pin is moved into and out of locking position by a pin 24 carried by a disk 25 on the inner end of the rotary member of a lock, probably of the Yale lock type, which is provided on its outer end with a keyhole 26 to receive a suitable key. The lock casing is provided on its outer end with a flange 27 which fits into an opening 28 in the side of the casing 3 and at its inner end is provided with lugs 29 and 30 through which extend screws 31 and 32 the outer ends of which extend into recesses formed in lugs 33 and 34 which extend inward from the periphery of the opening 28, and serve to hold the lock casing against removal and against rotation. The tube 6 and the inner tube 19, are suitably cut away opposite the opening 28 as shown in Figure 3 to receive the inner end of the lock casing and permit the disk 25 to be in line with and directly below the axis of the locking pin. On its under side, the locking pin is provided with a notch 35 to receive pin 24 and is also, preferably, provided on opposite sides of the notch with recesses 36 and 37, to receive the periphery of the disk 25.

On rotating the rotary member of the lock by means of a key inserted in the keyhole 26, the locking pin 22 will be moved into or out of locking engagement with the recess 23 in the steering post.

The ends of the securing strap 9 and the heads of the screws 31 and 32 being within the casing 3 and consequently the end of 10 of the strap cannot be detached except from the inside through the opening 14 nor can the lock casing be removed except by getting at the screws 31 and 32 through this opening. It is therefore important to provide for locking the cap 15 against removal when the locking pin is in engagement with the recess of the steering post. To provide for this locking of the cap, the cap is provided on its inner side with an inwardly extending annular flange 40 provided with a recess 41 into which the outer end of the locking pin 22 extends when in locking position, thus locking the cap against rotation. A recess 42 in the locking pin near its outer end is adapted to receive the flange 40 when the locking pin is withdrawn from engagement with the steering post but is not in its extreme rearward position. When in its extreme rearward position the portion of the locking pin to the right of the recess 42 as shown in Figure 4 will be in position to engage the flange 40 and prevent the cap from being rotated. The cap is thus held locked against removal when the locking pin is in locking position and also when moved to extreme rearward position and the cap can be removed only when the locking pin is in intermediate position and as it can be moved to this intermediate position only by use of the key, the lock casing cannot be opened by anyone not having the key.

The inner or floating tube 19 is pressed against the steering post by a coiled spring 43 which bears at one end against the outer or rear end of this tube and at its outer end against the flange 40.

The lugs 20 and 21 of the inner or floating tube 19 afford an extended bearing on the steering post and are held in contact with the post by spring 43. By reason of the extended bearing afforded by them, the locking pin is effectively prevented from being sprung out of the recess in the steering post and it is made possible to use a locking pin of smaller diameter than would otherwise be required and of course, to make the recess 23 of relatively small diameter thus avoiding weakening the steering post.

The inner or floating tube 19 supports the locking pin throughout its entire length, effectually preventing any possibility of bending or springing it out of line and this inner or floating tube is supported by the tube 6 which is supported in turn by the casing 3 and by the wall of the opening 7 in the housing 2.

In order to apply the lock to an automobile, all that is necessary is to bore the opening 7 in the steering post casing and the recess 23 in the steering post. The casing 3 is then placed against the housing with the inner end of tube 6 in the opening 7. The strap 9, being previously secured at its end 12 by screw 13 is then brought around the housing and, the cap 15 being removed, is secured by bolt 11. The cap is then screwed into place and the lock is ready for use.

The recess 23 in the steering post may be so arranged that in order to bring it into line with the locking pin, the steering wheel will have to be rotated to swing the wheels to one side or the other or into any position which will make it impossible to run the automobile for any appreciable distance without unlocking.

Having thus described my invention, what I claim is:—

1. In a lock for a shaft having a recess therein for a locking pin and having a housing about it provided with an opening through it in line with the recess in the shaft, the combination with an outer tube having its inner end adapted to enter the opening in the housing, a floating tube movable within the outer tube having its inner end concaved to fit the periphery of the shaft, a locking pin movable within the floating tube, means for moving the forward end of the pin into and out of the recess in the shaft, and a casing carrying the outer tube and means for securing it to the housing.

2. In a lock for a shaft having a recess therein for a locking pin and having a housing about it provided with an opening through it in line with the recess in the shaft, the combination with an outer tube having its inner end adapted to enter the opening in the housing, a floating tube movable within the outer tube having its inner end concaved to fit the periphery of the shaft and provided with laterally extending lugs to give increased bearing on the shaft, a locking pin movable within the floating tube, means for moving the forward end of the locking pin into and out of the recess in the shaft, and a casing carrying the outer tube and means for securing it to the housing.

3. In a lock for a shaft having a recess therein for a locking pin and having a housing about it provided with an opening through it in line with the recess in the shaft, the combination with an outer tube having its inner end adapted to enter the opening in the housing, a floating tube movable within the outer tube having its inner end concaved to fit the periphery of the shaft, means for pressing the floating tube against the shaft, a locking pin movable within the floating tube, means for moving the forward end of the locking pin into and out of the recess in the shaft, and a casing carrying the outer tube and means for securing it to the housing.

4. In a lock for a shaft having a recess therein for a locking pin and having a housing about it provided with an opening through it in line with the recess in the shaft, the combination with an outer tube having its inner end adapted to enter the opening in the housing, a floating tube movable within the outer tube having its inner end concaved to fit the periphery of the shaft, a locking pin movable within the floating tube, means for moving the forward end of the locking pin into and out of the recess in the shaft, and a casing carrying the outer tube and means for securing it to the housing comprising a strap extending about the housing having its ends secured within the casing.

5. In a lock for a shaft having a recess therein for a locking pin and having a housing about it provided with an opening through it in line with the recess in the shaft, the combination with an outer tube having its inner end adapted to enter the opening in the housing, a floating tube movable within the outer tube having its inner end concaved to fit the periphery of the shaft, a locking pin movable within the floating tube, means for moving the forward end of the locking pin into and out of the recess in the shaft, and a casing carrying the outer tube provided on its forward end with lugs adapted to embrace the housing and means for securing the casing to the housing comprising a strap extending about the housing having its ends secured to the casing within the lugs.

6. In a lock for a shaft having a recess therein for a locking pin and having a housing about it provided with an opening through it in line with the recess in the shaft, the combination with an outer tube having its inner end adapted to enter the opening in the housing, a floating tube movable within the outer tube having its inner end concaved to fit the periphery of the shaft, a locking pin movable within the floating tube, means for moving the forward end of the locking pin into and out of the recess in the shaft, and a casing carrying the outer tube, means at its forward end for securing it to the housing and an opening at its outer end provided with a removable cover.

7. In a lock for a shaft having a recess therein for a locking pin and having a housing about it provided with an opening through it in line with the recess in the shaft, the combination with an outer tube having its inner end adapted to enter the opening in the housing, a floating tube movable within the outer tube having its inner end concaved to fit the periphery of the shaft, a locking pin movable within the floating tube, means for moving the forward end of the locking pin into and out of the recess in the shaft, and a casing carrying the outer tube having an opening at its outer end provided with a removable cover, means for securing the casing to the housing comprising lugs on its forward end adapted to embrace the housing and a strap adapted to extend about the housing having its ends secured to the casing within the lugs.

8. In a lock for a shaft having a recess therein for a locking pin and having a housing about it provided with an opening through it in line with the recess in the shaft, the combination with an outer tube having its inner end adapted to enter the opening in the housing, a floating tube movable within the outer tube having its inner end concaved to fit the periphery of the shaft, a locking pin movable within the floating tube, means for moving the forward end of the locking pin into and out of the recess in the shaft, and a casing carrying the outer tube having an opening at its outer end provided with a removable cover, means for securing the casing to the housing, comprising a strap extending about the housing having its ends secured to the casing, the fastening means for one end of the strap being accessible only through the opening in the rear end of the casing.

9. In a lock for a shaft having a recess therein for a locking pin and having a housing about it provided with an opening through it in line with the recess in the shaft, the combination with an outer tube having its inner end adapted to enter the opening in the housing, a floating tube movable within the outer tube having its inner end concaved to fit the periphery of the shaft, a locking pin movable within the floating tube, means for moving the forward end of the locking pin into and out of the recess in the shaft, and a casing carrying the outer tube having an opening in its outer end provided with a removable cover means for securing the casing to the housing comprising a strap extending about the housing having its ends secured to the casing, the fastening means for one end of the strap being accessible only through the opening in the rear end of the casing, the locking pin being adapted to engage the cover for the opening to prevent its removal when said locking pin is in locking position.

10. In a lock for a shaft having a recess therein for a locking pin and having a housing about it provided with an opening through it in line with the recess in the shaft, the combination with an outer tube having its inner end adapted to enter the opening in the housing, a floating tube movable within the outer tube having its inner end concaved to fit the periphery of the shaft, a locking pin movable within the floating tube, means for moving the forward end of the locking pin into and out of the recess in the shaft, and a casing carrying the outer tube having an opening in its outer end provided with a removable cover means for securing the casing to the housing comprising a strap extending about the housing having its ends secured to the casing, the fastening means for one end of the strap being accessible only through the opening in the rear end of the casing, the locking pin being adapted to engage the cover for the opening to prevent its removal when said locking pin is in locking position or in fully unlocked position.

11. In a lock for a shaft having a recess therein for a locking pin and having a housing about it provided with an opening through it in line with the recess in the shaft, the combination with an outer tube having its inner end adapted to enter the opening in the housing, a floating tube movable within the outer tube having its inner end concaved to fit the periphery of the shaft, a locking pin movable within the floating tube, means for moving the forward end of the locking pin into and out of the recess in the shaft, and a casing carrying the outer tube having an opening in its outer end provided with a removable cover, means for securing the casing to the housing comprising a strap extending about the housing having its ends secured to the casing, the fastening means for one end of the strap being accessible only through the opening in the rear end of the casing, the locking pin being adapted to engage the cover for the opening to prevent its removal when said locking pin is in locking position, comprising an inwardly extending flange on the cover extending over the rear portion of the locking pin.

12. In a lock for a shaft having a recess therein for a locking pin and having a housing about it provided with an opening through it in line with the recess in the shaft, the combination with an outer tube having its inner end adapted to enter the opening in the housing, a floating tube movable within the outer tube having its inner end concaved to fit the periphery of the shaft, a locking pin movable within the floating tube, means for moving the forward end of the locking pin into and out of the recess in the shaft, and a casing carrying the outer tube having an opening in its outer end provided with a removable cover having an inwardly extending flange, means for securing the casing to the housing comprising a strap extending about the housing having its ends secured to the casing, the fastening means for one end of the strap being only accessible through the opening in the rear end of the casing, the locking pin being adapted to engage the inwardly extending flange of the removable cover for the opening to prevent its removal when said locking pin is in locking position and being provided with a notch to receive the flange and permit the cover to be rotated when the locking pin is in intermediate position.

In testimony whereof I hereunto affix my signature.

JOHN J. FARRELL.